United States Patent
Brooks et al.

(10) Patent No.: US 10,511,672 B2
(45) Date of Patent: *Dec. 17, 2019

(54) HANDLING MULTI-PIPE CONNECTIONS

(71) Applicant: International Business Machines Corporation, Armonk, NY (US)

(72) Inventors: Michael D. Brooks, Southampton (GB); Alan Hollingshead, Eastleigh (GB); Julian C. Horn, Eastleigh (GB); Philip I. Wakelin, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,949

(22) Filed: Jul. 2, 2018

(65) Prior Publication Data

US 2018/0316765 A1 Nov. 1, 2018

Related U.S. Application Data

(63) Continuation of application No. 14/929,830, filed on Nov. 2, 2015, now Pat. No. 10,051,062, which is a
(Continued)

(51) Int. Cl.
*G06F 15/16* (2006.01)
*H04L 29/08* (2006.01)
(Continued)

(52) U.S. Cl.
CPC .......... *H04L 67/141* (2013.01); *H04L 1/1621* (2013.01); *H04L 67/143* (2013.01); *H04L 67/42* (2013.01); *H04L 69/14* (2013.01)

(58) Field of Classification Search
USPC ........................................................ 709/227
See application file for complete search history.

(56) References Cited

U.S. PATENT DOCUMENTS 6,212,164 B1 * 4/2001 Murakami ......... H04Q 11/0478
370/230
6,330,582 B1 12/2001 Kuo et al.
(Continued)

OTHER PUBLICATIONS

Brooks et al., "Handling Multi-Pipe Connections", U.S. Appl. No. 16/024,976, filed Jul. 2, 2018, 27 pages.
(Continued)

*Primary Examiner* — Alicia Baturay
(74) *Attorney, Agent, or Firm* — Edward J. Wixted, III

(57) ABSTRACT

Methods, systems, and computer program products for handling multi-pipe connections is provided. A primary pipe request for a connection between a client and a server is received. The connection includes a plurality of pipes between the client and the server. The primary pipe request includes a number corresponding to the amount of pipes required for the connection. A first response acknowledging the receipt of the primary pipe request is transmitted. The first response includes a token. A plurality of subsequent pipe requests are received for the connection between the client and the server. Each subsequent pipe request includes the token. A subsequent response to each subsequent pipe request is transmitted. A count of the number of pipe requests received is maintained. The established pipes are released after a period of time has elapsed when the number of pipe requests received doesn't reach the number of pipes required for the connection.

4 Claims, 6 Drawing Sheets

Related U.S. Application Data continuation of application No. 14/849,739, filed on Sep. 10, 2015, now Pat. No. 9,948,724.

(51) Int. Cl.
*H04L 29/06* (2006.01)
*H04L 1/16* (2006.01)

(56) References Cited

U.S. PATENT DOCUMENTS

| | | | |
|---|---|---|---|
| 6,438,602 B1 | 8/2002 | Lane | |
| 6,901,596 B1 | 5/2005 | Galloway | |
| 7,236,458 B2* | 6/2007 | Lee | H04L 12/5601 370/230 |
| 7,401,114 B1* | 7/2008 | Block | G06F 15/173 709/203 |
| 7,418,712 B2 | 8/2008 | Kruglick et al. | |
| 7,623,450 B2* | 11/2009 | Basso | H04L 49/90 370/230 |
| 7,921,686 B2* | 4/2011 | Bagepalli | H04L 63/166 370/352 |
| 7,962,636 B2 | 6/2011 | Stafie et al. | |
| 7,990,998 B2* | 8/2011 | Prakash | H04L 12/2898 370/450 |
| 8,121,124 B2* | 2/2012 | Baykal | H04L 12/185 370/390 |
| 8,443,069 B2* | 5/2013 | Bagepalli | H04L 63/166 709/203 |
| 8,843,627 B1* | 9/2014 | Baldi | H04L 43/026 709/224 |
| 9,019,878 B2* | 4/2015 | Anders, Jr. | H04W 76/14 370/311 |
| 9,026,613 B2* | 5/2015 | Jooste | H04L 67/02 709/217 |
| 9,100,371 B2* | 8/2015 | Bagepalli | H04L 63/166 |
| 9,282,040 B2* | 3/2016 | Reddy | H04L 47/10 |
| 9,491,201 B2* | 11/2016 | Bagepalli | H04L 63/166 |
| 9,613,224 B2* | 4/2017 | Wang | G06F 16/27 |
| 9,614,916 B2* | 4/2017 | Jooste | H04L 67/02 |
| 9,641,581 B2* | 5/2017 | Karlsen | H04N 21/2223 |
| 9,948,724 B2* | 4/2018 | Brooks | H04L 67/141 |
| 10,051,062 B2* | 8/2018 | Brooks | H04L 67/141 |
| 2015/0379257 A1* | 12/2015 | Ahmed | G06F 16/245 726/19 |
| 2017/0078401 A1 | 3/2017 | Brooks et al. | |
| 2017/0078402 A1 | 3/2017 | Brooks et al. | |
| 2018/0316766 A1* | 11/2018 | Brooks | H04L 67/141 |

OTHER PUBLICATIONS

IBM, "List of Patent Applications Treated As Related", Appendix P, Filed Herewith, 2 pages.

* cited by examiner

HANDLING MULTI-PIPE CONNECTIONS

BACKGROUND OF THE INVENTION

The present invention relates generally to the field of client-server connections, and more particularly to handing a connection between a client and a server that uses multiple pipes.

A client process (e.g., a transaction gateway) can establish a communication link with a server (e.g., a transaction server) to allow the client process to then schedule work on behalf of other clients in that server. Both the client and server processes act as nodes at either end of a network connection. The network connection between a pair of nodes is often referred to as a network pipe and the nodes then use pipe handler objects to either attempt to open a pipe to a remote node, or to respond to the arrival of a connection attempt from another node. The connection can consist of multiple pipes to allow a greater volume of concurrent requests to be scheduled. Each pipe is started with a connection message being sent from the client to the server, and then ends when the server has completed its handling of the request and returned a response message over the newly established pipe. The connection is not fully established until all of the required pipes have been opened. In some instances, where the request is not successfully delivered, the connection between the client and the server is left partially created.

SUMMARY

According to one embodiment of the present invention, a method for handling multi-pipe connections is provided. The method includes receiving, by one or more processors, a primary pipe request for a connection between a client and a server, wherein the connection comprises a plurality of pipes between the client and the server, and wherein the primary pipe request comprises a number corresponding to the amount of pipes required for the connection; transmitting, by one or more processors, a first response acknowledging receipt of the primary pipe request for the connection, wherein the first response comprises a token for the connection, and wherein the first response indicates that a first pipe has been established; receiving, by one or more processors, a plurality of subsequent pipe requests for the connection between the client and the server, wherein each subsequent pipe request includes the token for the connection; transmitting, by one or more processors, a subsequent response to each subsequent pipe request, wherein the subsequent response indicates that a respective pipe has been established; maintaining, by one or more processors, a count of the number of pipe requests received; and releasing, by one or more processors, the established pipes after a period of time has elapsed, wherein the count of the number of pipe requests received does not reach the number for the pipes required for the connection.

According to another embodiment of the present invention, a computer program product for handling multi-pipe connections is provided. The computer program product comprises a computer readable storage medium and program instructions stored on the computer readable storage medium. The program instructions include program instructions to receive a primary pipe request for a connection between a client and a server, wherein the connection comprises a plurality of pipes between the client and the server, and wherein the primary pipe request comprises a number corresponding to the amount of pipes required for the connection; program instructions to transmit a first response acknowledging receipt of the primary pipe request for the connection, wherein the first response comprises a token for the connection, and wherein the first response indicates that a first pipe has been established; program instructions to receive a plurality of subsequent pipe requests for the connection between the client and the server, wherein each subsequent pipe request includes the token for the connection; program instructions to transmit a subsequent response to each subsequent pipe request, wherein the subsequent response indicates that a respective pipe has been established; program instructions to maintain a count of the number of pipe requests received; and program instructions to release the established pipes after a period of time has elapsed, wherein the count of the number of pipe requests received does not reach the number for the pipes required for the connection.

According to another embodiment of the present invention, a computer system for handling multi-pipe connections is provided. The computer system includes one or more computer processors, one or more computer readable storage media, and program instructions stored on the computer readable storage media for execution by at least one of the one or more processors. The program instructions include program instructions to receive a primary pipe request for a connection between a client and a server, wherein the connection comprises a plurality of pipes between the client and the server, and wherein the primary pipe request comprises a number corresponding to the amount of pipes required for the connection; program instructions to transmit a first response acknowledging receipt of the primary pipe request for the connection, wherein the first response comprises a token for the connection, and wherein the first response indicates that a first pipe has been established; program instructions to receive a plurality of subsequent pipe requests for the connection between the client and the server, wherein each subsequent pipe request includes the token for the connection; program instructions to transmit a subsequent response to each subsequent pipe request, wherein the subsequent response indicates that a respective pipe has been established; program instructions to maintain a count of the number of pipe requests received; and program instructions to release the established pipes after a period of time has elapsed, wherein the count of the number of pipe requests received does not reach the number for the pipes required for the connection.

Advantageously, the server starts a primary task to store the number of pipes required for the connection, to generate the token contained in the response acknowledging receipt of the request for a connection and to maintain the count of the number of pipe requests received. The server can best operate the process of establishing the multiple connection pipes using a single dedicated server task, which can be considered as a long-lived primary task, which will continue to operate throughout the entire period that the pipes are being established between the client and server.

Beneficially, the server is operated to suspend the primary task after receiving a pipe request, resume the primary task on receiving a new pipe request and terminate the primary task once the count of the number of pipe requests received equals the number of pipes required for the connection. The primary task will exist within the server and will suspend and resume as the pipe requests are received. A new pipe request being received will cause the primary task to be resumed and once the respective pipe is established the primary task will be suspended, pending the receipt of the next pipe request. This process will continue until the final pipe request is received. At this point, the primary task will establish this final pipe and then terminate.

Advantageously, the server will operate to start a separate additional task, for each subsequently received pipe request, to establish a pipe for the respective pipe request and to terminate the separate additional task following completion of the establishment of the pipe for the respective pipe request. The actual establishment of a specific pipe can be carried out by a short lived dedicated secondary task, which will be created within the server for the sole purpose of creating the pipe between the client and server and then terminating immediately afterwards.

Advantageously, the primary task is further operated to set a time limit on a period for waiting to receive the next pipe request prior to releasing the established pipes if the count of the number of pipe requests received does not reach the number for the pipes required for the connection. The process being run by the server within the primary task will be suspended after the receipt of a pipe request, assuming that there are still further pipe requests to be received (as determined by comparing the current count of pipe requests with the expected overall number of pipe requests as detailed in the very first request from the client). The task will either resume on receipt of a new pipe request or time out after a predetermined time period has elapsed. If the primary task times out then the connection has failed for some reason. The primary task is then terminated and all of the established pipes will be cancelled. This prevents the server entering a state whereby it is waiting for further pipe requests to come in and establish further pipes, when a failure has occurred that means that the expected pipe requests are not received. Resources are therefore freed for other use in a timely and efficient manner.

DETAILED DESCRIPTION

Figure 1:
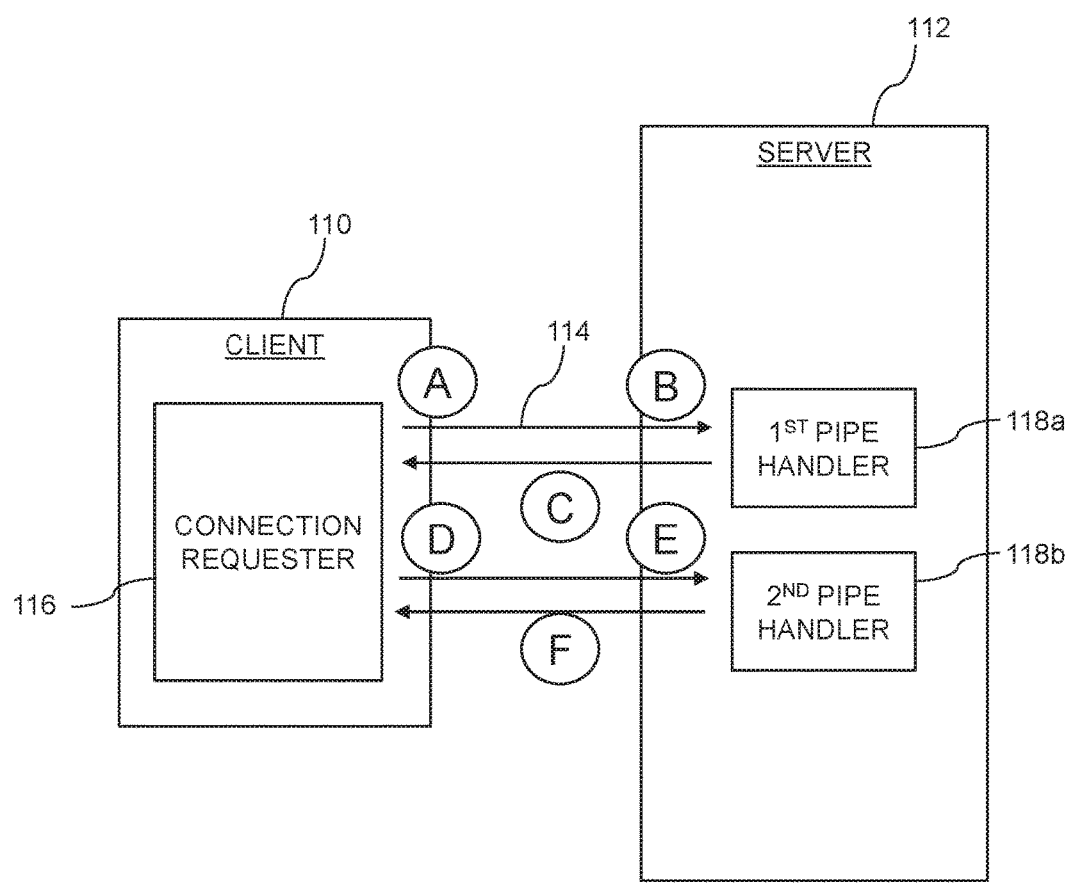
FIG. 1 is a block diagram illustrating the creation of a pipe between a client and a server.

An embodiment of the present invention recognizes that if the client is unable to send all of its pipe request messages then the server is left with a partially established connection. In some instances, the server can remain indefinitely in a partially connected state. FIG. 1 is a block diagram illustrating the creation of a pipe between a client and a server. In some instances, where a pipe request is lost between client 110 and server 112, a partial connection is indefinitely created.

FIG. 1 shows client 110 connected to server 112, where the connection interaction is operated, illustrating instances where a partial connection can be created. Long lived connection requester 116 within client 110 (at point A) transmits request 114 to server 112, where it is received (at point B). In response to receiving request 114, short-lived task pipe handler 118a is created within server 112. Task pipe handler 118a opens a pipe between client 110 and server 112 and acknowledges the opening of the pipe to client (at point C). Task pipe handler 118a terminates once acknowledgement of the pipe is completed, having established a pipe between client 110 and server 112.

Connection requester 116 of client 110 transmits another request for an additional pipe to be opened (at point D), which is received by server 112 (at point E). Another short-lived task pipe handler 118b is created within server 112, which performs the same actions as the previous task pipe handler 118a of acknowledging the receipt of the request (at point F), establishing a pipe between client 110 and server 112, and immediately terminating. Any further requests for pipes to be established between client 110 and server 112 are handled in the same manner, with temporary tasks being created in server 112 to handle the receipt of the message, respond to the message, and establish a pipe as requested.

In one example, described with reference to FIG. 1, server 112 remains indefinitely in a partially connected state to client 110. Client 110 has a long lived process (e.g., connection requester 116) running that transmits individual pipe connection request messages 114 (transmitted at point A) to the server 112 (received at point B) and receives message responses (received at point C) in reply. Server 112 attaches a pipe handler task 118a whenever a new connection message is received from client 110. Pipe handler task 118 terminates after pipe handler task 118 opens a path to the new pipe, processes the message that pipe handler task 118a received over the pipe, and sends back a response to client 110. If one of the connection requests cannot be sent by client 110, such as a second request (transmitted at point D), or if the second request is lost before it arrives at the server 112 (at point E), then server 112 is unaware of the problem. In some examples, server 112 does not have a task pipe handler 118b running to anticipate the arrival of another message. The acknowledgement message (point F) will not be sent if the second pipe request (transmitted at point D) is not received by server 112.

Embodiments of the present invention recognize that a disadvantage of the arrangement shown in FIG. 1 is that server 112 does not know if a request from connection requester 116 of client 110 for a pipe to be established has failed. In this context, failed means that the request did not reach server 112, for whatever reason. For example, connection requester 116 may wish to open five separate pipes with server 112, in order to process a large amount of data concurrently. If, after two successful pipe requests, a subsequent pipe request fails, server 112 will not be aware of this and the first two created pipes will be opened and established, but unused and consuming resources.

Figure 2:
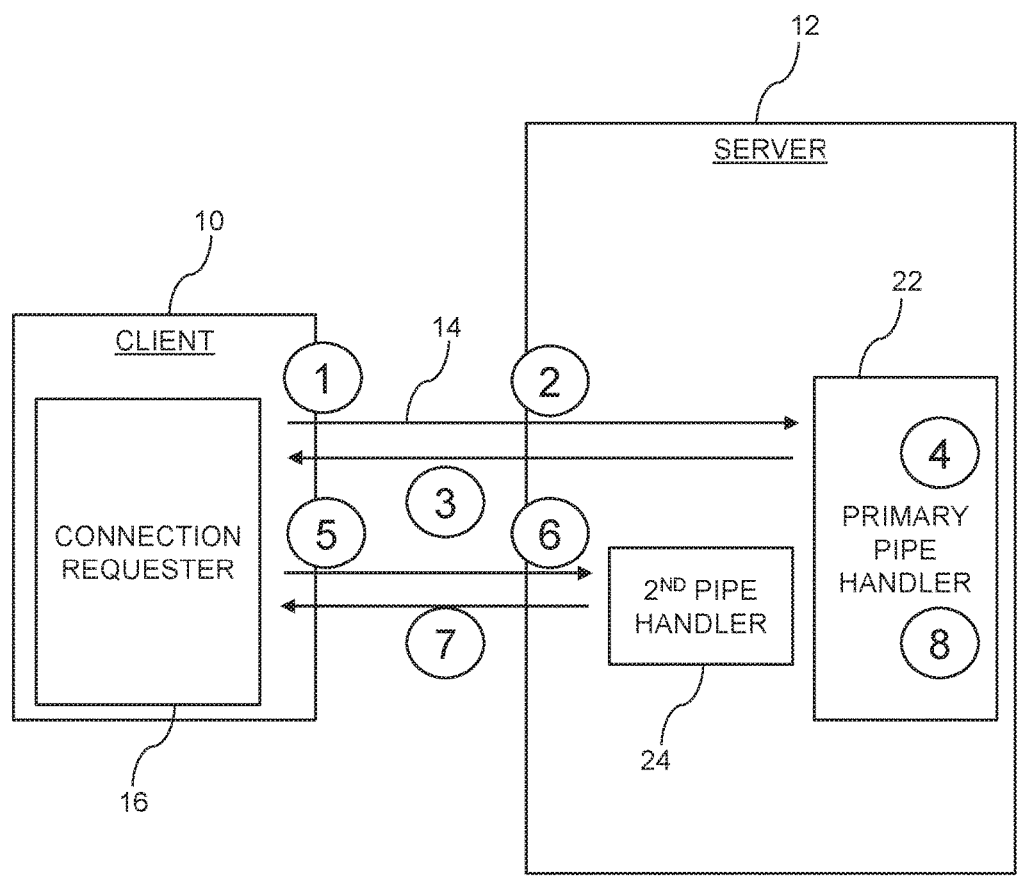
FIG. 2 is a block diagram of a client and a server, in accordance with an embodiment of the present invention.

FIG. 2 is a block diagram of a client and a server, in accordance with an embodiment of the present invention. FIG. 2 shows an embodiment of client 10 and server 12. The operation of both client 10 and server 12 is changed, with respect to FIG. 1, in order to improve the ability of server 12 to detect and react to a failed attempt to receive a pipe request message. The numbered actions 1 to 8 in FIG. 2 are explained below in more detail with reference to FIG. 3. Client 10 includes connection requester 16. Connection requester 16, when making first pipe request 14 to server 12, includes a request for the number of pipes required for the connection being established. In pipe request 14, a field will be reserved that stores a numerical value, which connection requester 16 uses to state the total number of pipes to be established.

Server 12 receives a primary pipe request 14 for a connection between client 10 and server 12 from client 10, which includes the number of pipes required. In response, server 12 creates primary pipe handler 22, which is a long lived task that will be used for the entirety of the pipe establishment process, managing the server side of the process. Primary pipe handler 22 comprises a multi-socket handler logic within server 12. Primary pipe handler 22 stores the total number of pipes that are to be established in the current connection and generates a token for the connection. The token is transmitted back to client 10 as part of the acknowledgement of the receipt of primary pipe request 14.

The token can be generated using an algorithm that will generate an effectively unique combination of characters (e.g., letters and numbers) for pipe request 14. For example, in some embodiments a token is created using ten characters in total. The purpose of the token is to enable primary pipe handler 22 to identify subsequent pipe requests from client requester 16 within client 10. Client requester 16 includes the token within each subsequent pipe request, allowing primary pipe handler 22 to link the new pipe requests to the original pipe request. Client requestor 16 also counts the number of pipe requests received versus the expected number (e.g., the number designated in primary pipe request 14).

Figure 3:
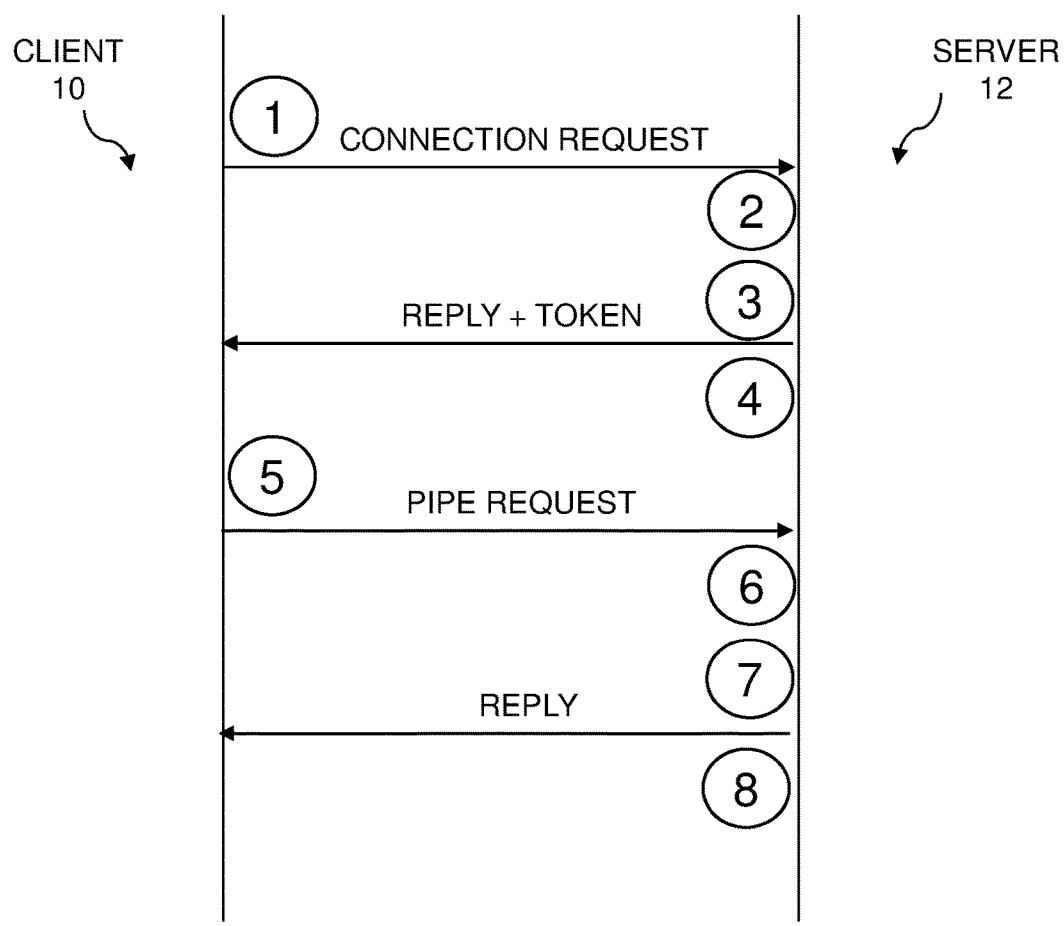
FIG. 3 is a block diagram of communications between a client and a server, within the environment of FIG. 2, in accordance with an embodiment of the present invention.

FIG. 3 is a block diagram of communications between a client and a server, within the environment of FIG. 2, in accordance with an embodiment of the present invention. FIG. 3 illustrates the sequence of operations as shown by the numbers in circles used in FIG. 2. In operation 1, client 10 sends a request to establish a primary pipe into a network. The request for connection indicates the total number of pipes that the client requires for the connection. In operation 2, the message is received by server 12 and primary pipe handler 22. Primary pipe handler 22 is attached to process the message. Primary pipe handler 22 notes the number of pipes that the connection will consist of and stores the information. In operation 3, primary pipe handler 22 creates a token that server 12 uses to identify a connection attempt. The token is included in the response message sent by server 12 to client 10 indicating that the primary pipe is established.

In operation 4, primary pipe handler 22 is suspended for an interval defined by primary pipe handler 22. In operation 5, client 10 receives the response, extracts the token from the response, and returns the token with all subsequent messages that client 10 sends to primary pipe handler 22 (e.g., requests for new pipes to be established for the current connection). In operation 6, server 12 receives a subsequent pipe request and attaches secondary pipe handler 24 to process the new pipe request. In operation 7, secondary pipe handler 24 extracts the token from the message and sends client 10 a response message indicating that the additional pipe has been established.

In operation 8, secondary pipe handler 24 uses the token to resume operation of primary pipe handler 22. Primary pipe handler 22 resumes its operation, updates the count of the number of pipes that have been established, and if this matches the total number of pipes expected, then primary pipe handler 22 marks the connection as open before terminating. Where more pipe request messages are expected, operations of primary pipe handler 22 are suspended until another pipe request arrives or primary pipe handler 22 times out. In examples where primary pipe handler 22 times out, primary pipe handler 22 assumes the connection attempt has stalled. In some embodiments, where primary pipe handler 22 times out, primary pipe handler 22 releases the pipes held by server 12 before terminating. In this way the primary pipe handler 22 allows client 10 to attempt to reconnect to server 12. The release of pipes prevents a request from being rejected due to another attempt to connect is still ongoing.

Figure 4:
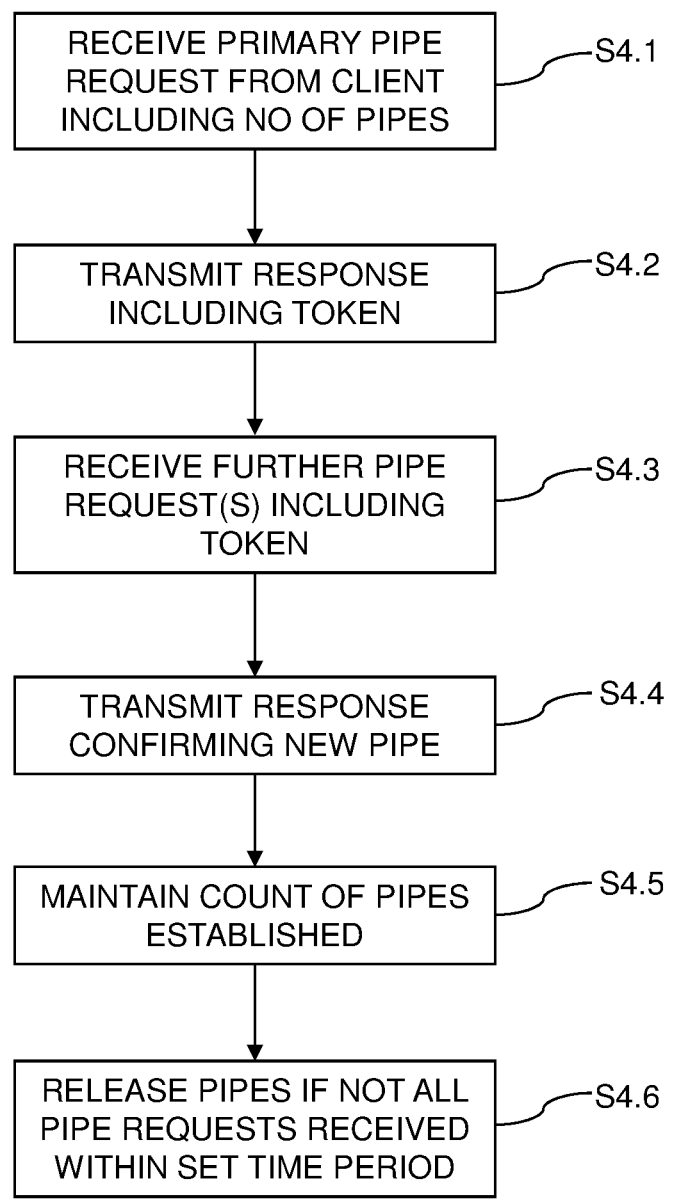
FIG. 4 is a flowchart depicting operations for the pipe handler, within the environment of FIG. 2, in accordance with an embodiment of the present invention.

FIG. 4 is a flowchart depicting operations for the pipe handler, within the environment of FIG. 2, in accordance with an embodiment of the present invention. In step S4.1, primary pipe handler 22 receives a primary pipe request from client 10 for a connection between client 10 and server 12. In some embodiments, the request for connection includes a request for multiple pipes between client 10 and server 12. In some embodiments, the request includes a field for the number of pipes required for the connection. In step S4.2, primary pipe handler 22 transmits a response to client 10 acknowledging receipt of the primary pipe request for the connection. The response includes a token for the connection. The token is created using an algorithm that generates a string of character of a pre-determined length. In step S4.3, primary pipe handler 22 receives a plurality of subsequent pipe requests from client 10 for the connection between client 10 and server 12. Each subsequent pipe request includes the token generated for the connection. The token allows primary pipe handler 22 to associate each subsequent pipe request with the primary pipe request.

In step S4.4, primary pipe handler 22 transmits a response to client 10 for each subsequent pipe request indicating that a respective pipe has been established. In step S4.5, primary pipe handler maintains a count of the number of pipe requests received. The count is based on the number of tokens received from client 10. In step S4.6, primary pipe handler 22 releases the established pipes after a predefined period of time has elapsed if the count of the number of pipe requests received does not reach the number for the pipes required for the connection. In some embodiments, server 12 creates primary pipe handler 22 following receipt of the initial request for a connection, received in step S4.1. In these embodiments, primary pipe handler 22 operates to perform steps S4.2-S4.6.

Primary pipe handler 22 maintains a count of the number of pipe requests received and compares this count to the expected number that was detailed in the initial request for a connection between client 10 and server 12. Primary pipe handler 22 continues to operate while there are pipe requests outstanding, primary pipe handler 22 suspends itself after the establishment of a new pipe and waits for the next pipe request. Primary pipe handler 22 has a predetermined time limit and will time out if no subsequent pipe request is received before the expiry of the time limit. Where primary pipe handler 22 times out, the established pipes are released and primary pipe handler 22 is terminated.

Operation of steps S4.1 through S4.6 provide a mechanism to permit a server to stop a connection attempt that is running under the control of a client. The client indicates in the primary pipe request message how many pipes are being established. The server region retains this information and, in some embodiments, extends the lifetime of its primary pipe handler to wait for the remaining pipe request messages to arrive. In some embodiments, the arrival of the subsequent pipe request messages are each handled with a separate task, because it is unknown at the point of arrival whether this request message is the beginning of a new connection attempt or one that is ongoing. The primary pipe handler can set a limit on how long the primary pipe handler will wait for the arrival of the next message before rejecting the overall connection attempt. Should this time limit be reached, the primary pipe handler can release those resources that have already been established, allowing a new connection attempt to take place.

Figure 5:
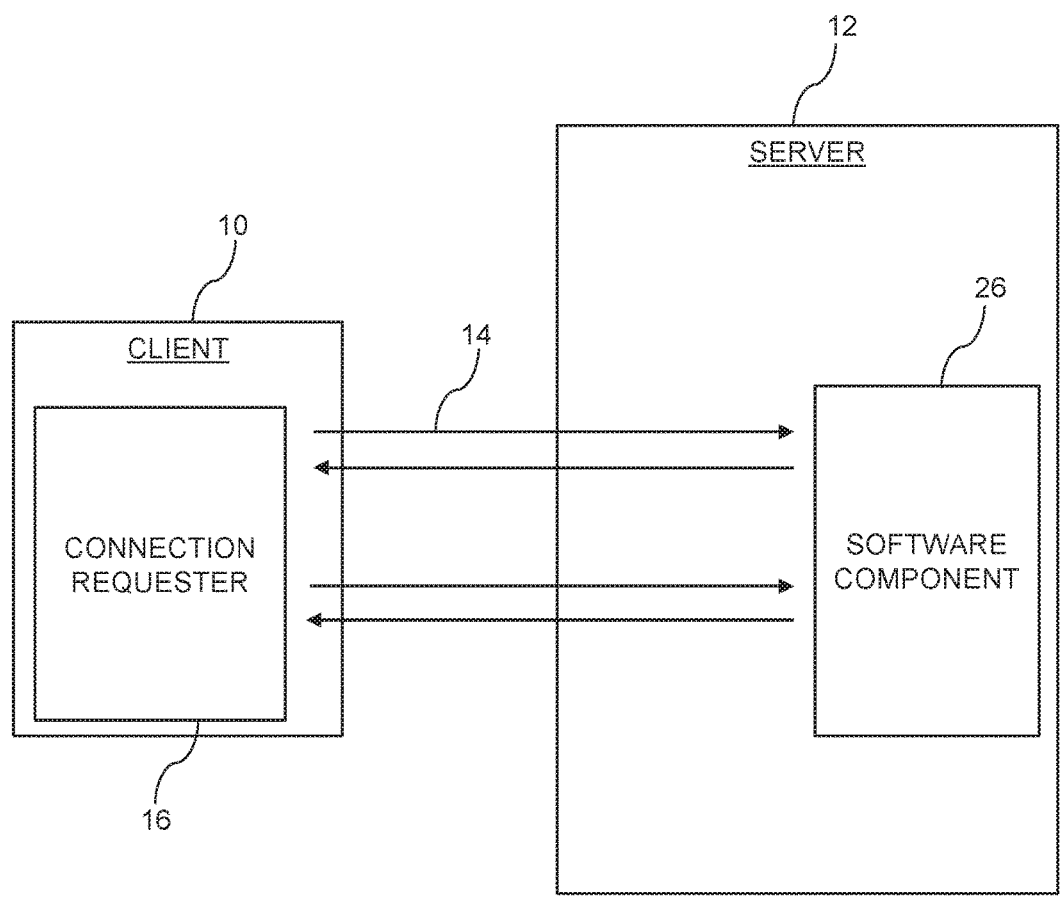
FIG. 5 is a block diagram of a client and a server, in accordance with an embodiment of the present invention.

FIG. 5 is a block diagram of a client and a server, in accordance with an embodiment of the present invention. FIG. 5 illustrates a second embodiment of the present invention, in which server 12 uses a single dedicated software component 26 that performs all of the actions in relation to primary pipe request 14 and subsequent pipe requests from client 10 to server 12. Software component 26 receives initial pipe request 14 from connection requester 16 and generates a token specific for primary pipe request 14. Software component 26 acknowledges primary pipe request 14 to client 10, while communicating the token to client 10 at the same time. The token is unique to the specific connection request.

Client 10 uses the token in all subsequent pipe requests, and software component 26 uses the token to identify the overall connection to which these pipe requests belong. Software component 26 maintains a count of the pipe requests as they are received from client 10 and determines when the correct number of pipe requests have been received. Each subsequent pipe request is handled directly by software component 26, which establishes a pipe in response to each subsequent pipe request and informs client 10 of the establishment of the respective pipe. When the correct number of pipes are established for the connection, software component 26 takes no further action in respect of the connection request.

Software component 26 releases the established pipes if the count of the number of pipe requests received does not reach the number for the pipes required for the connection, after a predefined period of time has elapsed. In this way, software component 26 is able to release resources when software component 26 determines that a sufficient period of time has elapsed, indicating that the expected pipe requests have not arrived. In some embodiments, the reason for the lack of the subsequent pipe requests is not material, software component 26 assumes that some failure has occurred at client 10 or in the network.

Figure 6:
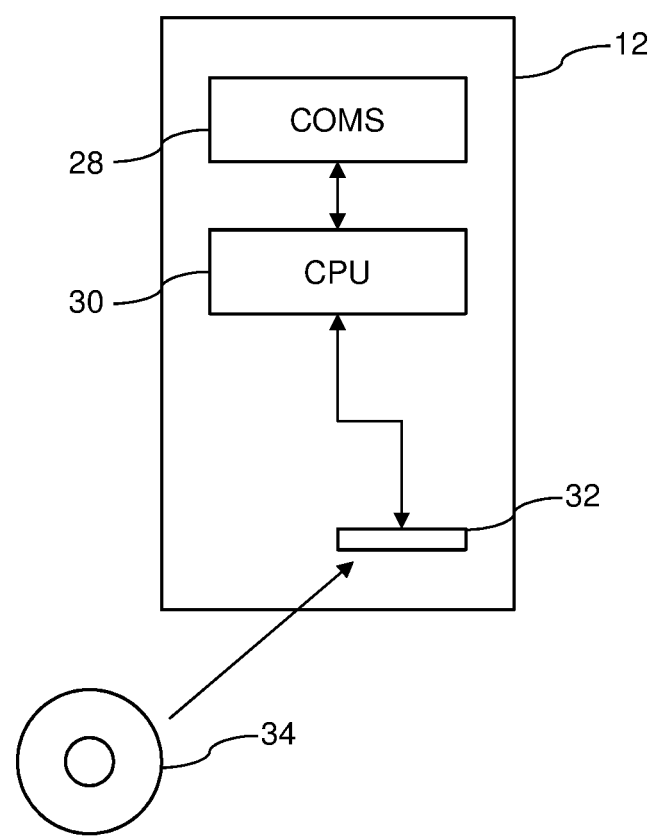
FIG. 6 is a block diagram of a server, in accordance with an embodiment of the present invention.

FIG. 6 is a block diagram of a server, in accordance with an embodiment of the present invention. Server 12 comprises network interface 28, processor 30 connected to network interface 28, and an external interface 32 that is also connected to processor 30. CD-ROM 34 is provided, which is an example of a computer readable medium containing a computer program product that comprises instructions for controlling the operation of processor 30. Server 12 can be operated to perform the computer-implemented method of FIG. 4. Network interface 28 is connected to client 10 via a suitable network, such as an Ethernet network, with messages being received by server 12 and messages transmitted by server 12 through network interface 28. Processor 30 carries out the pipe handling tasks that are required to implement the method described in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

receiving, by one or more processors, a primary pipe request for a connection between a client and a server, wherein the connection comprises a plurality of pipes between the client and the server, and wherein the primary pipe request comprises a number corresponding to the amount of pipes required for the connection;

starting, by one or more processors, a primary task, wherein the primary task stores the number of pipes required for the connection;

transmitting, by one or more processors, a first response acknowledging receipt of the primary pipe request for the connection, wherein the first response comprises a token for the connection, and wherein the first response indicates that a first pipe has been established;

receiving, by one or more processors, a plurality of subsequent pipe requests for the connection between the client and the server, wherein each subsequent pipe request includes the token for the connection;

starting, by one or more processors, a secondary task, wherein the secondary task corresponds to each subsequently received pipe request;

transmitting, by one or more processors, a subsequent response to each subsequent pipe request, wherein the subsequent response indicates that a respective pipe has been established;

maintaining, by one or more processors, a count of the number of pipe requests received; and releasing, by one or more processors, the established pipes after a period of time has elapsed, wherein the count of the number of pipe requests received does not reach the number for the pipes required for the connection.

2. The method of claim 1, further comprising:

suspending, by one or more processors, the primary task in response to receiving a first subsequent pipe request;

resuming, by one or more processors, the primary task in response to receiving a new pipe request; and terminating, by one or more processors, the primary task in response to the count of the number of pipe requests received equalling the number of pipes required for the connection.

3. The method of claim 1, further comprising:

establishing, by one or more processors, a pipe between the client and the server, wherein the pipe corresponds to the respective pipe request; and terminating, by one or more processors, the secondary task in response to establishing the pipe for the respective pipe request.

4. The method of claim 1, wherein the primary task is further operated to set a time limit on a period for waiting to receive the next pipe request prior to releasing the established pipes if the count of the number of pipe requests received does not reach the number for the pipes required for the connection.

* * * * *